Patented Apr. 12, 1927.

1,624,162

UNITED STATES PATENT OFFICE.

JAN HENDRIK DE BOER, OF EINDHOVEN, NETHERLANDS, ASSIGNOR TO N. V. PHILIPS' GLOEILAMPENFABRIEKEN, OF EINDHOVEN, NETHERLANDS.

PROCESS FOR CONVERTING HAFNIUM AND ZIRCONIUM PHOSPHATES.

No Drawing. Application filed June 19, 1925, Serial No. 38,359, and in the Netherlands August 13, 1924.

This invention relates to a process for converting hafnium- and zirconium salts, more particularly for converting phosphates of hafnium and of zirconium. The term "phosphates" is hereinafter to be understood to mean the orthophosphates as well as the pyro- and metaphosphates.

The zirconium and the hafnium can be isolated from the zirconium ores so as to be free of any impurities by treating the zirconium ore with a flux e. g. with sulphuric acid and by adding phosphoric acid to the hafnium- and zirconium compounds dissolved in a strong acid medium. In contradistinction to the fact that the phosphates of the metals occurring in the ores in addition to hafnium and zirconium, are soluble in a strong acid, hafnium- and zirconium phosphates cannot be dissolved in it. These hafnium- and zirconium compounds together can consequently be obtained in a pure state by simple filtration.

Separating a mixture of hafnium- and zirconium salts by starting from the mixture of the phosphates or converting the mixture of the phosphates into other compounds is only possible if fusion with soda or other similar methods have to be avoided, by bringing the phosphates into a soluble form. Although in general the phosphates of hafnium and of zirconium are not soluble in strong acids, it is possible, as has been described in previous applications, to bring the phosphates of hafnium and of zirconium into a soluble form with the aid of hydrofluoric acid, oxalic acid, phosphoric acid or strong sulphuric acid.

It has now been found that compounds having a chemical formula which in determined places contains one or more hydroxyl groups, are also capable of bringing the said compounds of hafnium and zirconium into a soluble form and of converting them into complex hafnium- and zirconium compounds. To these compounds belong hydrogen-peroxide and a determined group of organic compounds.

According to the invention, the process for converting hafnium and zirconium phosphate into other hafnium and zirconium compounds, consists in forming complex hafnium- and (or) zirconium compounds by adding to hafnium- and (or) zirconium phosphate in a basic medium hydrogen-peroxide or one or more organic compounds in which to at least one carbon atom is bound an alcohol group and to an adjacent carbon atom is bound an alcohol group or a carboxyl group.

According to the invention, in the solution thus obtained the complex hafnium- and zirconium compounds are converted into the oxides of hafnium and of zirconium. Before the precipitation of the oxides the phosphoric acid may be precipitated from the solution as an insoluble phosphate.

The soluble compounds of hafnium and of zirconium which can be prepared in accordance with this process, are of a complex nature, for it has been found that in this solution the common reactions on the zirconium ion turn out to be negative.

Among the organic compounds belonging to the said class must be reckoned the alcohols which are at least bivalent and have alcohol groups which are bound to carbon atoms lying one beside the other consecutively e. g. glycerine, glucose, cane-sugar, pyrocatechin, pyrogallol, etc. On the contrary, complex compounds cannot be formed with the aid of hydrochinon, phloroglucin etc. as in these alcohols the alcohol groups are bound to carbon-atoms which do not lie one beside the other. Further must be mentioned a oxyacids e. g. lactic acid, tartaric acid etc. in which compounds an alcohol group and a carboxylgroup are bound to two carbon atoms lying one beside the other.

The invention will be more clearly understood with the aid of some examples.

If two kilograms of zirkite, containing about 40% of zirconium oxide, are converted into phosphate by treating the ore with a flux, whereupon phosphoric acid is added, most of the impurities consisting materially of iron, can be eliminated by decanting and washing. The phosphate suspension thus produced can be brought into solution by treating it with three kilograms of canesugar and so much caustic soda that a strong alkaline reaction is obtained. The more caustic soda is used the quicker the phosphate enters into solution. The last traces of iron, if any, can be eliminated from this solution by introducing hydrogen sulphide ($H_2S$) into it. From the thus obtained solution containing in additon the phosphoric acid, zirconium and hafnium which is almost free of any other metal compounds, zirconium and hafnium free of phosphoric acid, can be won back in different ways. For example, the phosphoric acid can be precipitated in the alkaline liquid with the aid of barium-chloride. After filtration zirconium-hydroxide can be precipitated by exactly neutralizing. After adding some acid to the liquid free of phosphate, the organic substance can be eliminated by oxidizing, for example, with potassium-persulphate and by precipitating thereupon the oxides of hafnium and zirconium with a base or the liquid being free of phosphate can be evaporated to dryness and thus the organic compounds can be decomposed. After adding a small quantity of acid to the solution free of phosphate it is also possible to precipitate with the aid of hydrogen-peroxide, owing to which the peroxides of hafnium and zirconium are precipitated or after adding a small quantity of acid a deposit can be precipitated with the aid of chromic acid or ferrocyanide of hydrogen or ammonium-oxalate. Finally it is possible to precipitate the oxides of hafnium and zirconium without first removing the phosphates, for example, by cautiously adding some acid until the reaction relatively to phenolphthalein is yet slightly alkaline.

Hafnium- and zirconium compounds free of phosphate can be precipitated with the aid of alcohol from a solution of hafnium and zirconium phosphates in glycerine to which is added some alkali.

The complex compounds formed in an alkaline medium with the aid of hydrogen-peroxide can be decomposed by simply heating the solution, during which heating the oxides of hafnium and zirconium are precipitated.

What I claim is:—

1. A process for converting hafnium and zirconium phosphates into other hafnium and zirconium compounds, characterized in that complex hafnium and zirconium compounds are formed by adding to hafnium and zirconium phosphates in a basic medium at least one organic compound in which two adjacent carbon atoms are bound to hydroxyl groups.

2. A process for converting hafnium and zirconium phosphates into other hafnium and zirconium compounds, characterized in that complex hafnium and zirconium compounds are formed by adding to hafnium and zirconium phosphate in a basic medium at least one organic compound in which to at least one carbon atom is bound an alcohol group and to an adjacent carbon atom is bound a carboxyl group.

3. A process for converting hafnium and zirconium phosphates into other hafnium and zirconium compounds, characterized in that complex hafnium and zirconium compounds are formed by adding to hafnium and zirconium phosphate in a basic medium at least one organic compound in which two adjacent carbon atoms are bound to hydroxyl groups and that said complex compounds are converted into oxides of hafnium and zirconium.

4. A process for converting hafnium and zirconium phosphates into other hafnium and zirconium compounds, characterized in that complex hafnium and zirconium compounds are formed by adding to hafnium and zirconium phosphate in a basic medium at least one organic compound in which to at least one carbon atom is bound an alcohol group and to an adjacent carbon atom is bound a carboxyl group, and that said complex compounds are converted into oxides of hafnium and zirconium.

5. A process for converting hafnium and zirconium phosphates into other hafnium and zirconium compounds, characterized in that complex hafnium and zirconium compounds are formed by adding to hafnium and zirconium phosphate at least one organic compound in which two adjacent carbon atoms are bound to hydroxyl groups, and that the phosphoric acid is precipitated from the solution as an insoluble phosphate, whereupon the oxides of hafnium and zirconium are precipitated.

6. A process for converting hafnium and zirconium phosphates into other hafnium and zirconium compounds, characterized in that complex hafnium and zirconium compounds are formed by adding to hafnium and zirconium phosphate in a basic medium at least one organic compound in which to at least one carbon atom is bound an alcohol group and to an adjacent carbon atom is bound a carboxyl group and that the phosphoric acid is precipitated from the solution as an insoluble phosphate, whereupon the oxides of hafnium and zirconium are precipitated.

7. A process for converting hafnium and zirconium phosphates into other hafnium and zirconium compounds, characterized in that complex hafnium and zirconium compounds are formed by adding to hafnium and zirconium phosphate in a basic medium at least one organic compound in which two adjacent carbon atoms are bound to hydroxyl groups, and that the phosphoric acid is precipitated from the solution as an insoluble phosphate, whereupon the oxides of hafnium and zirconium are precipitated with a base, the organic compound being eliminated by oxydizing.

8. A process for converting hafnium and zirconium phosphates into other hafnium and zirconium compounds, characterized in that complex hafnium and zirconium compounds are formed by adding to hafnium and zirconium phosphate in a basic medium at least one organic compound in which to at least one carbon atom is bound an alcohol group, and to an adjacent carbon atom is bound a carboxyl group, and that the phosphoric acid is precipitated from the solution as an insoluble phosphate, whereupon the oxides of hafnium and zirconium are precipitated with a base, the organic compounds being eliminated by oxydizing.

In testimony whereof I affix my signature, at the city of Eindhoven, this 29th day of May, A. D. 1925.

JAN HENDRIK DE BOER.